United States Patent [19]

Chien et al.

[11] 4,148,687

[45] Apr. 10, 1979

[54] METHOD FOR SAVINGS IN NUCLEAR REACTORS BY USING BERYLLIUM RODS IN FUEL BUNDLES

[75] Inventors: Ji-Peng Chien; Chao-Yie Yang; Horng-Ming Hsieh, all of Tao-Yuan, Taiwan

[73] Assignee: Institute of Nuclear Energy Research, Tao-Yuan, Taiwan

[21] Appl. No.: 717,575

[22] Filed: Aug. 26, 1976

[51] Int. Cl.² .................. G21C 1/06; G21C 7/08; G21C 3/30; G21C 5/00

[52] U.S. Cl. .................. 176/42; 176/33; 176/78; 176/84; 176/92 B

[58] Field of Search .................. 176/78, 84, 85, 92 B, 176/92 R, 71, 33, 40, 42

[56] References Cited

U.S. PATENT DOCUMENTS

| 2,796,396 | 6/1957 | Szilard | 176/92 B |
|---|---|---|---|
| 2,837,477 | 6/1958 | Fermi | 176/84 |
| 2,970,097 | 1/1961 | Correc | 176/85 |
| 3,081,247 | 3/1963 | Balent | 176/84 |
| 3,100,188 | 8/1963 | Fraas | 176/85 |
| 3,128,235 | 4/1975 | Hackney | 176/78 |
| 3,215,606 | 11/1965 | Silvester | 176/40 |
| 3,253,997 | 5/1966 | Abbott | 176/78 |
| 3,255,083 | 6/1966 | Klahr | 176/40 |
| 3,318,778 | 5/1967 | Morita | 176/78 |
| 3,687,804 | 8/1972 | Mills | 176/78 |
| 3,941,654 | 3/1976 | Tarasuk | 176/78 |

OTHER PUBLICATIONS

Glasstone, "Principles of Nuclear Reactor Engineering", 5th Ed., 1957, pp. 738–741.

Primary Examiner—Samuel W. Engle
Assistant Examiner—Donald P. Walsh
Attorney, Agent, or Firm—Burns, Doane, Swecker & Mathis

[57] ABSTRACT

Nuclear fuels in the form of rod bundle with one or several beryllium rods inserted therein are proposed for use in power reactors positioned to obtain reactivity increase in order to save the D₂O inventory in a heavy water reactor or to relax the requirement of uranium enrichment if used in light water reactors.

4 Claims, 6 Drawing Figures

METHOD FOR SAVINGS IN NUCLEAR REACTORS BY USING BERYLLIUM RODS IN FUEL BUNDLES

FIELD OF INVENTION

The present invention relates generally to method for saving in nuclear reactors and more particularly to methods by embedding or inserting beryllium (or its compounds) into the fuel bundle of nuclear reactors to reduce the inventory of $D_2O$ in a heavy water reactor or to relax the requirement of uranium enrichment in a light water reactor and the resulting fuel elements without substantially detrimentally affecting the neutron multiplication value of the reactor.

Having low (n, 2n) threshold and extremely small neutron capture cross sections, the beryllium can be used in a reactor as not only a good neutron moderator but also a fast neutron multiplier. With one or several beryllium rods properly embedded in a bundle-type fuel element at regions where the neutrons have energies at or above the (n, 2n) threshold of the beryllium; the (n, 2n) reactions in beryllium can be effectively utilized to take part of the neutron slowing down job and also to achieve some additional neutron multiplication. Because of these two fast neutron effects, the lattice pitch (and thus the $D_2O$ inventory) of a heavy water reactor fuel cell can be reduced by properly embedding beryllium rods in the fuel without diminishing the neutron multiplication factor. In the case of light water reactors, a properly beryllium embedded fuel element of lower enriched uranium can be made to have the same neutron multiplication as that of a higher enriched one.

BACKGROUND OF INVENTION

Reactors, such as CANDU, employing heavy water moderation are attractive because of their ability to use natural uranium as the feed fuel. The lattice pitch needed for such $D_2O$ reactors, however, is usually large as compared to other types of reactors using enriched fuels, resulting in a big core and large inventory of the heavy water moderator which is quite costly. It is recalled that a significant part of the capital cost of a heavy water reactor is for the $D_2O$ inventory.

As for light water reactors, it is well known that only enriched uranium fuels can make the reactor critical. However, if the uranium enrichment of the fuel can be reduced without decreasing the overall neutron multiplication effect, the fuel cost of this type of reactors will be more economic than that of the existing ones.

SUMMARY OF INVENTION

The invention disclosed here is to properly embed a light element such as beryllium (or its compounds), which has low (n, 2n) threshold and extremely small fast and thermal neutron capture cross sections with good neutron slowing down power, in nuclear fuel bundles positioned to obtain reactivity increases by utilizing the beryllium (n, 2n) reactions to partially slow down the fast neutrons and to gain one extra neutron in the meantime from each of these reactions. Because of these fast neutron effects of beryllium (n, 2n) reaction and the negligible capture of both fast and thermal neutrons by beryllium, the resonance absorption in the fuel, the fast leakage probability and the slowing down area are reduced and the neutron multiplication factor of a nuclear fuel element is increased if the beryllium rods are properly inserted into the fuel element. Since (n, 2n) reactions can be induced only by neutrons having energies not less than the threshold, the beryllium rods should be placed at positions inside the fuel bundle at positions where the neutrons have energies at or above the (n, 2n) threshold for the beryllium in order to effectively utilize the fast neutron effects.

DETAILED DESCRIPTION OF EMBODIMENTS

Figure 1:
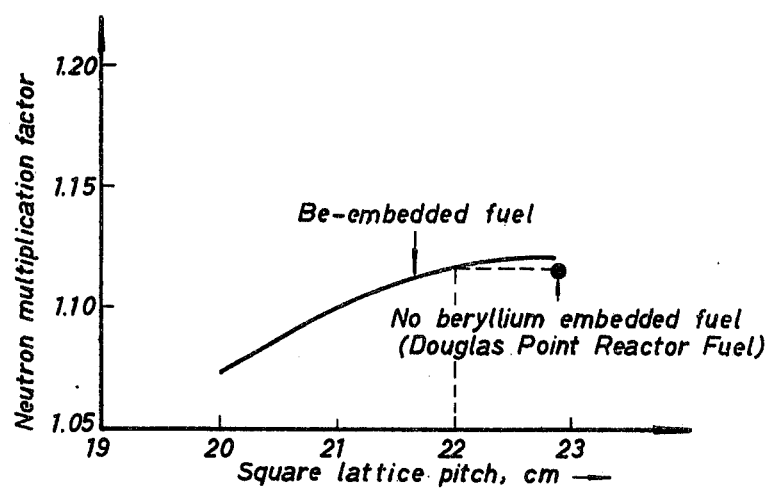
FIG. 1 is a plot of the neutron multiplication factor versus lattice pitch for a Douglas Point pressurized heavy water reactor type (CANDU-PHW) fuel element with and without a beryllium rod replacing the central fuel rod.

FIG. 1 shows the neutron multiplication factor versus lattice pitch as calculated by a Monte Carlo code, HWCOR-SAFE, for a typical CANDU 19-rods fuel element used in the Douglas Point Nuclear Power Station in Canada. In the original Douglas Point fuel element, all 19 rods are made of natural $UO_2$ with Zircaloy-2 cladding and the square lattice pitch is 22.86 cm. In the proposed fuel element of the present invention including a beryllium containing rod, the central rod is replaced by a Zircaloy-2 sheathed beryllium rod of the same size. The calculation results as given in FIG. 1 show that the beryllium-embedded fuel with a pitch of 22 cm has about the same neutron multiplication value as that of the original Douglas Point fuel. A reduction of 0.86 cm in pitch here is equivalent to saving of about 9% of the $D_2O$ moderator inventory.

Figure 2:
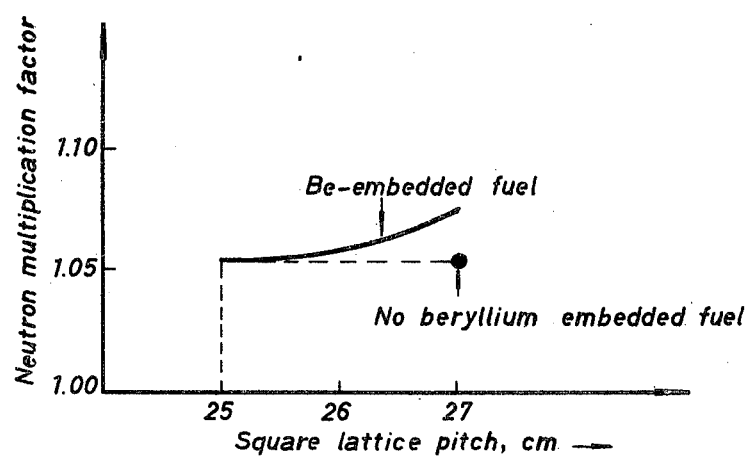
FIG. 2 is a graph showing the neutron multiplication factors for a fuel element as mentioned above except that here the coolant is changed from $D_2O$ to $H_2O$ and the central fuel rod is replaced either by a beryllium rod (the curve in FIG. 2) or by an unfuelled tubular central supporting rod (the data point in FIG. 2) to simulate the fuel element used in a CANDU type boiling light water reactor (CANDU-BLW).

As a second illustration of the use of an (n, 2n) scatterer in the heavy water reactor fuel, the coolant of the above-mentioned fuel is changed from $D_2O$ to $H_2O$ and the central fuel rod is replaced by an unfuelled tubular central supporting rod with the lattice pitch enlarged to about 27 cm to simulate a CANDU-BLW fuel such as that used in the Gentilly Nuclear Power Station in Canada. The reactivities calculated by Monte Carlo method for this fuel with and without the central tubular tie-rod replaced by a beryllium rod of the same size are shown in FIG. 2. It is seen from this figure that by inserting a beryllium rod in the center of the fuel element the lattice pitch can be reduced by about 2 cm without a decrease in reactivity, thus giving a saving of approximately 16.5% of the $D_2O$ moderator inventory for the present case.

Figure 3:
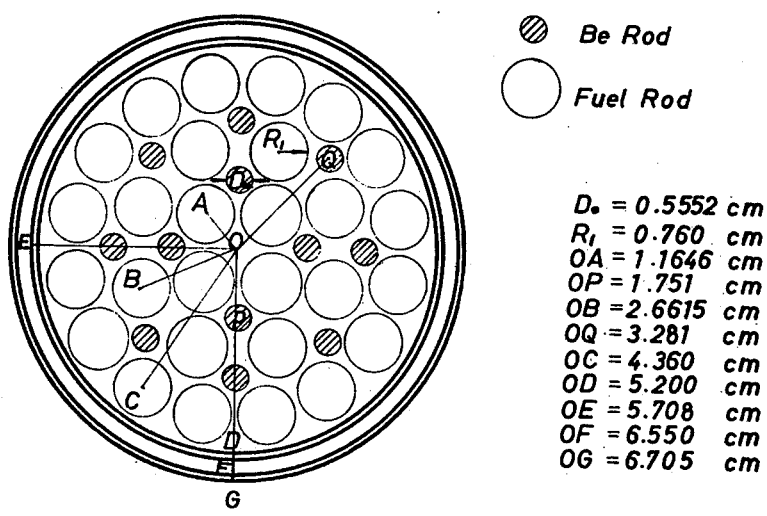
FIG. 3 is a drawing of the fuel element used in another CANDU-PHW reactor, the Pickering Generating Station, modified in accordance with the present invention.
Figure 4:
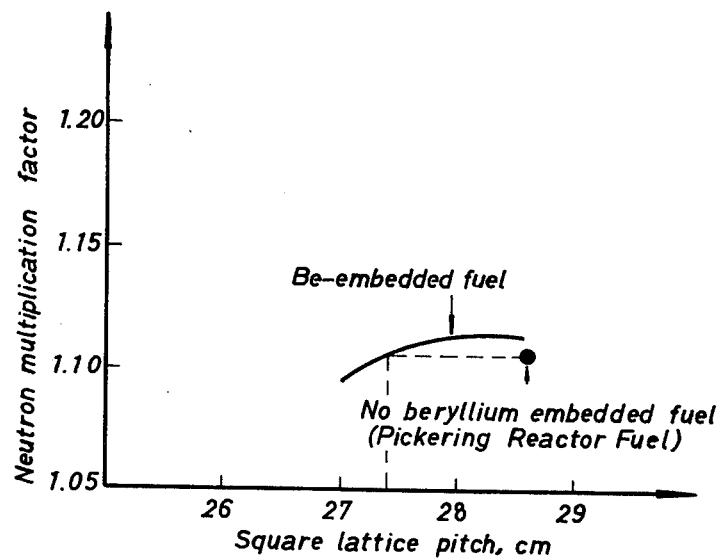
FIG. 4 shows the reactivities of the fuel element of FIG. 3 compared with that of a typical Pickering Generating Station heavy water reactor type fuel element.

FIG. 3 is a drawing on the CANDU 28-pins fuel element as used in the Pickering Generating Station in Canada with twelve additional beryllium rods embedded at positions as shown. From the calculated results of reactivity as given in FIG. 4, it is seen that with the twelve beryllium rods embedded in the fuel the pitch can be reduced from the original 28.58 cm to 27.4 cm without diminishing the reactivity of the original no-beryllium-embedded fuel. This, in turn, yields a saving of about 9.78% of the $D_2O$ moderator inventory.

Figure 5:
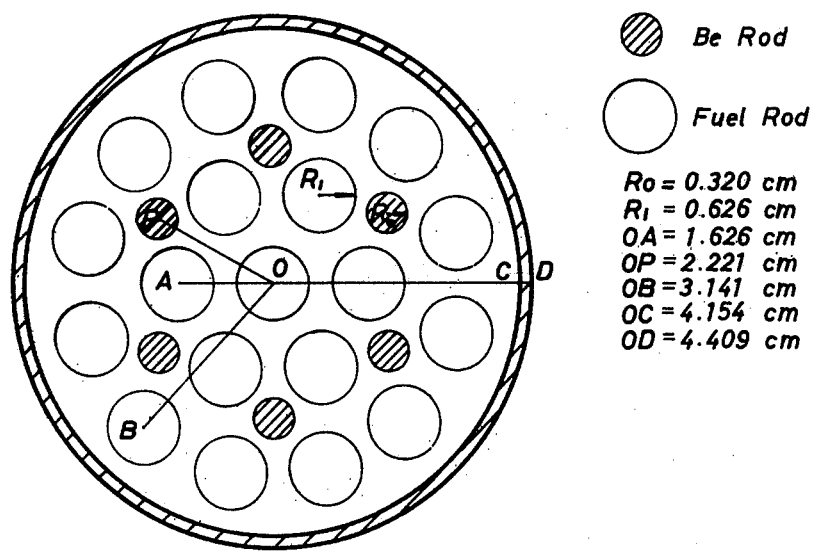
FIG. 5 is a cross-sectional plane view of a fuel element of the present invention for light water reactors.
Figure 6:
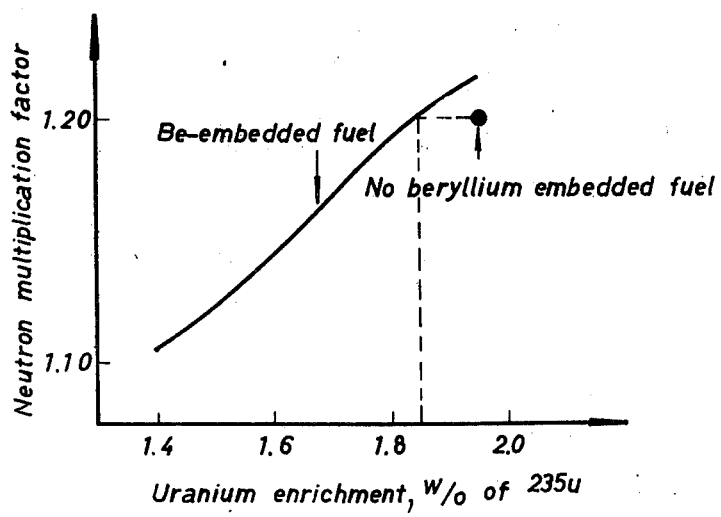
FIG. 6 is a graph of reactivity versus uranium enrichment for the fuel element shown in FIG. 5 with a square lattice pitch of 9.5 cm.

For light water reactors, in order to simplify the calculations by Monte Carlo method, a concentrically arranged fuel element may be utilized. FIG. 5 gives an example of the proposed LWR (light water reactor) fuel element with beryllium inserted therein. Each fuel element consists of bundle of 19 enriched $UO_2$ fuel rods and 6 smaller beryllium rods. Here, the fuel rod dimension was set to be the same as that of a typical boiling water reactor (BWR). To illustrate what achievement can be obtained by embedding beryllium rods into the fuel element as shown in FIG. 5, the reactivity calculations were done for the fuel with various uranium enrichment values and the results were plotted in FIG. 6. The uranium enrichment chosen for the fuel element with the six beryllium rods removed was 1.95 weight percent of $^{235}U$ which is typical for a boiling water reactor. A square lattice pitch of 9.5 cm was used in the Monte Carlo calculations here. It is seen from FIG. 6 that the uranium enrichment of a beryllium-embedded fuel can be lessened by about 0.1 weight percent and still yields the same neutron multiplication factor as compared to the fuel without beryllium embedded.

We claim:

1. In a heavy water moderated and cooled, natural uranium fueled nuclear reactor in which 19 fuel rods are arranged in a fuel bundle having a predetermined lattice pitch of 22.86 centimeters, one of said rods being located centrally within said bundle, the improvement which comprises replacing said central fuel rod with a rod comprising beryllium or its compounds whereby a lattice pitch of the resulting fuel bundle is reduced to 22 centimeters by the utilization of the (n, 2n) reaction effect on the beryllium without substantially detrimentally affecting the neutron multiplication value of the reactor.

2. In a heavy water moderated, light water cooled and natural uranium fueled nuclear reactor in which the fuel for the reactor is in the form of rod bundles each bundle containing 18 fuel rods about an unfueled tubular central tie rod and having a predetermined lattice pitch of about 27 centimeters, the improvement which comprises replacing said unfueled central rod with a rod comprising beryllium or its compounds whereby a lattice pitch of the resulting fuel bundle is reduced to about 25 centimeters by the utilization of the (n, 2n) reaction effect of the beryllium without substantially detimentally affecting the neutron multiplication value of the reactor.

3. A method of reducing the heavy water inventory in heavy water moderated and cooled reactors in which 19 fuel rods are disposed in a fuel bundle, one of said rods being disposed centrally in said bundle, the method comprising replacing said central fuel rod with a rod comprising beryllium or its compounds whereby the lattice pitch of the resulting fuel bundle can be reduced from 22.86 centimeters to 22 centimeters without substantially diminishing the neutron multiplication value of the reactor.

4. A method of reducing the heavy water inventory in heavy water moderated and light water cooled reactors in which the fuel is in the form of rod bundles, each bundle containing 18 fuel rods about an unfueled tubular central tie rod, said method comprising replacing said unfueled central rod with a rod comprising beryllium or its compounds whereby the lattice pitch of the resulting fuel bundle can be reduced from about 27 centimeters to about 25 centimeters without substantially diminishing the neutron multiplication value of the reactor.

* * * * *